United States Patent [19]

Kobayashi et al.

[11] Patent Number: 4,931,790

[45] Date of Patent: Jun. 5, 1990

[54] DIGITAL REMOTE CONTROL METHOD

[75] Inventors: Hiroshi Kobayashi; Shinji Suda, both of Hyogo, Japan

[73] Assignee: Mitsubishi Denki Kabushiki Kaisha, Tokyo, Japan

[21] Appl. No.: 154,451

[22] Filed: Feb. 8, 1988

Related U.S. Application Data

[63] Continuation of Ser. No. 727,153, Apr. 25, 1985, abandoned.

[30] Foreign Application Priority Data

Apr. 25, 1984 [JP] Japan ................................ 59-85332

[51] Int. Cl.[5] .............................................. H04Q 9/00

[52] U.S. Cl. .......................... 340/825.64; 340/825.57; 340/825.72

[58] Field of Search ...................... 340/825.57, 825.64, 340/825.63, 825.52, 825.07, 825.65, 348, 870.24, 825.72, 825.56, 825.2, 825.21, 825.53, 825.62, 825.69; 375/113, 23; 455/352, 353, 603, 608; 358/194.1; 370/8-10; 341/176, 178

[56] References Cited

U.S. PATENT DOCUMENTS

| | | | |
|---|---|---|---|
| 3,414,881 | 12/1968 | Chapman | 340/825.68 |
| 3,444,521 | 5/1969 | Breese | 340/825.07 |
| 3,753,221 | 8/1973 | Stevens | 367/197 |
| 4,141,010 | 2/1979 | Umpleby et al. | 340/825.63 |
| 4,207,524 | 6/1980 | Purchase | 340/825.64 |
| 4,232,297 | 11/1980 | Gerlach et al. | 375/23 |
| 4,245,347 | 1/1981 | Hutton et al. | 340/825.63 |
| 4,246,611 | 1/1981 | Davies | 358/194.1 |
| 4,277,779 | 7/1981 | Rohrbacher | 340/348 |
| 4,314,371 | 2/1982 | Covington et al. | 340/825.65 |
| 4,338,632 | 7/1982 | Falater | 340/825.63 |
| 4,408,204 | 10/1983 | Salvesen | 340/870.24 |
| 4,412,218 | 10/1983 | Niitsu | 340/825.56 |
| 4,464,651 | 8/1984 | Duhame | 340/825.72 |
| 4,497,060 | 1/1985 | Yang | 375/113 |
| 4,514,732 | 4/1985 | Hayes, Jr. | 340/825.57 |

FOREIGN PATENT DOCUMENTS

| | | | |
|---|---|---|---|
| 3106427 | 3/1982 | Fed. Rep. of Germany . | |
| 7822942 | 3/1979 | France . | |
| 30392 | 3/1981 | Japan | 340/825.63 |

OTHER PUBLICATIONS

Torelli, et al., "PCM Remote Control Chips Detect Transmission Errors", Electronic Engineering, vol. 55, 1983, pp. 41-43, 47.

"IC-Kit for Infrared Remote Control", ITT, Intermetall, Mac 6251-110-1E, Edition, Feb. 1987, pp. 1-12, SAA1050,SAA1051.

A. J. Edwards, "ITT's New Infra-Red Remote Control System", Television, vol. 30, No. 2, Dec. 1979, pp. 71-73.

A. J. Edwards, "An Infra Red Remote Control for Consumer Applications", Electronic Technology, vol. 14, Mar. 1980, pp. 62-65.

*Primary Examiner*—Donald J. Yusko
*Assistant Examiner*—Edwin C. Holloway, III
*Attorney, Agent, or Firm*—Sughrue, Mion, Zinn, Macpeak & Seas

[57] ABSTRACT

A digital remote control method in which interference among different devices is eliminated by the use of a custom code and an instruction code. In accordance with the invention, a transmission code is generated composed of an instruction code and a custom code, with the custom code and instruction code differing in the number of bits contained in each. The custom code is transmitted prior to the instruction code with an interval therebetween longer than the intervals between adjacent pulses, which intervals define data "0" and "1".

3 Claims, 3 Drawing Sheets

DIGITAL REMOTE CONTROL METHOD

This is a continuation of Application Ser. No. 727,153, filed Apr. 25, 1985, now abandoned.

BACKGROUND OF THE INVENTION

The present invention relates to a digital remote control method in which data bits "0" and "1" are identified according to different pulse intervals, and the pulses are transmitted after being modulated with a signal of a particular frequency. More particularly, the invention relates to a digital remote control device which includes a custom code and which is obtained by improving a data code forming a transmission instruction.

An example of a conventional ordinary remote control system will be described with reference to FIG. 1. In FIG. 1, reference numeral 1 designates a signal transmitting circuit; 2, a signal receiving circuit; 3, a light-emitting section composed of light-emitting diodes or other light-emitting elements which generate light in response to the output of the signal transmitting circuit 1; and 4, a light-detecting section composed of photodiodes or other light-detecting elements which receive a light signal 5 from the light-emitting section 3. The output of the light-detecting section 4 is applied to the signal receiving circuit 2.

In the remote control system thus constructed, data to be transmitted is encoded and modulated by the signal transmitting circuit 1, and the output of the signal transmitting circuit 1 is converted into the light signal 5 by the light-emitting section 3, which signal 5 is transmitted. The light signal 5 thus transmitted is received by the light-detecting section 4 and demodulated by the signal receiving circuit 2.

In the transmission system of the device of this type, the data bits "0" and "1" are distinguished by different pulse intervals, as shown in FIGS. 2A and 2B which indicate pulse waveforms representing bits "0" and "1". That is, "0" is represented by a short pulse interval 11 as shown in FIG. 2A and "1" is represented by a long pulse interval 12 as shown in FIG. 2B.

Heretofore a data coding method has been employed in which, as shown in FIG. 3 indicating a conventional transmission code format, several bits "0" and "1" are combined into one word 21, and instructions are classified according to the data code represented by the word 21. In addition, in order to avoid interference with other remote control systems, some bits of the transmission code are assigned to a custom code (such as may be indicative of the transmitting system) while the remaining bits are assigned to an instruction code. For instance when, of 10 bits forming a transmission code, 3 bits are employed as a custom code and 7 bits are employed as an instruction code, 8 ($=2^3$) kinds of independent systems each having 128 ($=2^7$) instructions can be formed. In FIG. 3, reference numeral 22 designates the repetitive period of the transmission code.

In more detail, as shown in FIG. 4, on the signal transmitting side, when a key in a key-matrix 10 is depressed, a key input read circuit 11 detects the key thus depressed and applies data representative thereof to a code modulation circuit 12, control signals for which are supplied by a timing generator 13 receiving timing pulses from a clock oscillator 14. In the code modulation circuit 12, a data code corresponding to this data is produced and converted into pulse intervals representing "0" and "1". The output of the code modulation circuit 12 is applied to a transistor of a driver circuit 15, thereby to drive a light-emitting diode 16 to cause the latter to output a light signal.

On the signal receiving side, the transmitted light signal is received by a photodiode 17, the output of which is applied through a preamplifier to a remote control signal demodulation circuit 19. The signal thus applied is demodulated and outputted.

A variety of remote control systems of different bit arrangements have been proposed in the art. However, since they are similar to one another in "0" and "1" decision reference and in bit number, they all suffer from signal interference; that is, they cannot be used for remote control purposes.

SUMMARY OF THE INVENTION

The present invention has been accomplished to solve the above-described problems and to eliminate the above-described difficulties.

More specifically, an object of the invention is to provide a digital remote control method in which interference between remote control systems is minimized and a number of independent remote control systems can be employed.

Achieving the above-described objects, according to the invention, a remote control transmission code is divided into a custom code and an instruction code having different numbers of bits. On the signal transmitting side, first the custom code, having a first predetermined number of bits, is transmitted, and then the instruction code, which has a different number of bits, is transmitted.

DESCRIPTION OF THE PREFERRED EMBODIMENTS

A preferred embodiment of the invention will be described in detail with reference to the accompanying drawing.

Figure 1:
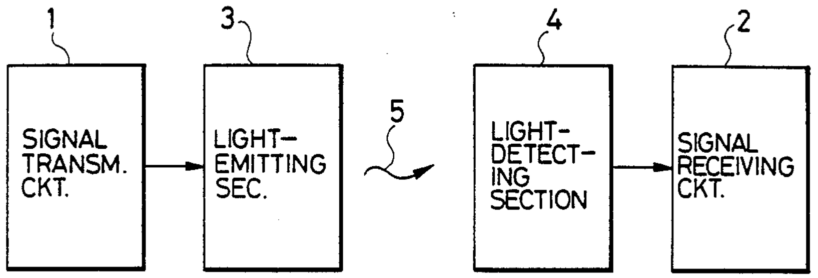
FIG. 1 PRIOR ART
FIG. 1 is a block diagram showing an example of a conventional remote control system.
Figure 2A:
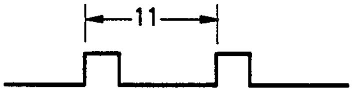
PRIOR ART FIG. 2A
FIGS. 2 and 3 are, respectively, a pulse waveform diagram and a transmission code format diagram and are used for a description of the operation of the system shown in FIG. 1.
Figure 2B:
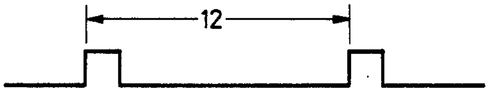
Figure 3:
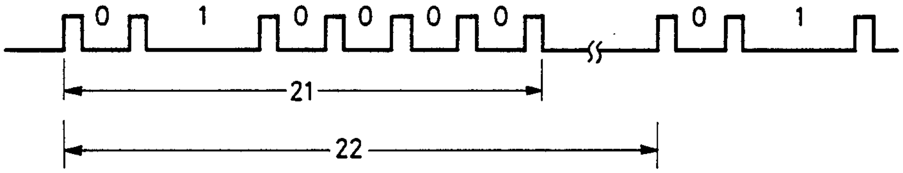
FIG. 3 PRIOR ART
Figure 5:
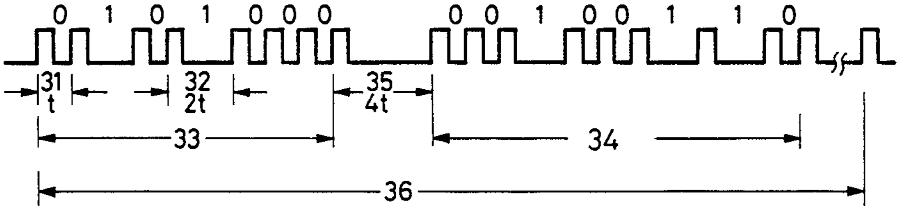
FIG. 5 is a timing chart showing a transmission code in a remote control signal in an example of a digital remote control method according to the invention.
Figure 4:
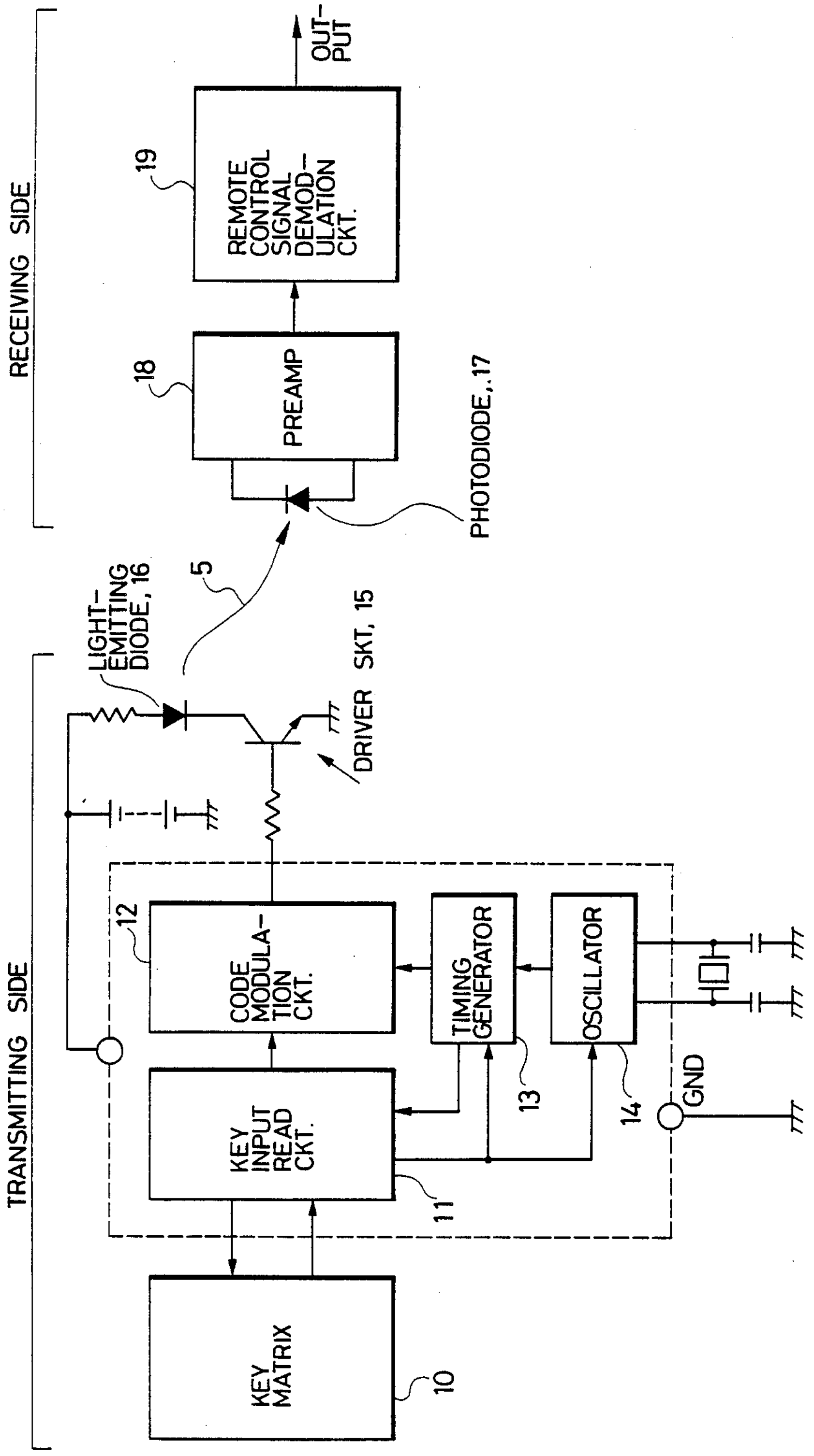
FIG. 4 PRIOR ART
FIG. 4 is a more detailed block diagram of a conventional remote control system.

FIG. 5 is a diagram showing an example of a code sequence produced by a remote control device according to the invention. In FIG. 5, reference numeral 31 designates a pulse interval of 1 ms (t) representing a bit "0"; 32, a pulse interval of 2 ms (2t) representing a bit "1"; 33, a custom code composed of 7 bits; and 34, an instruction code composed of 8 bits. Further in FIG. 5, reference numeral 35 designates a pulse interval of 4 ms (4t) indicating the interval between the custom code 33 and the instruction code 34; and 36, the repetition period of a transmission code.

Figure 6:
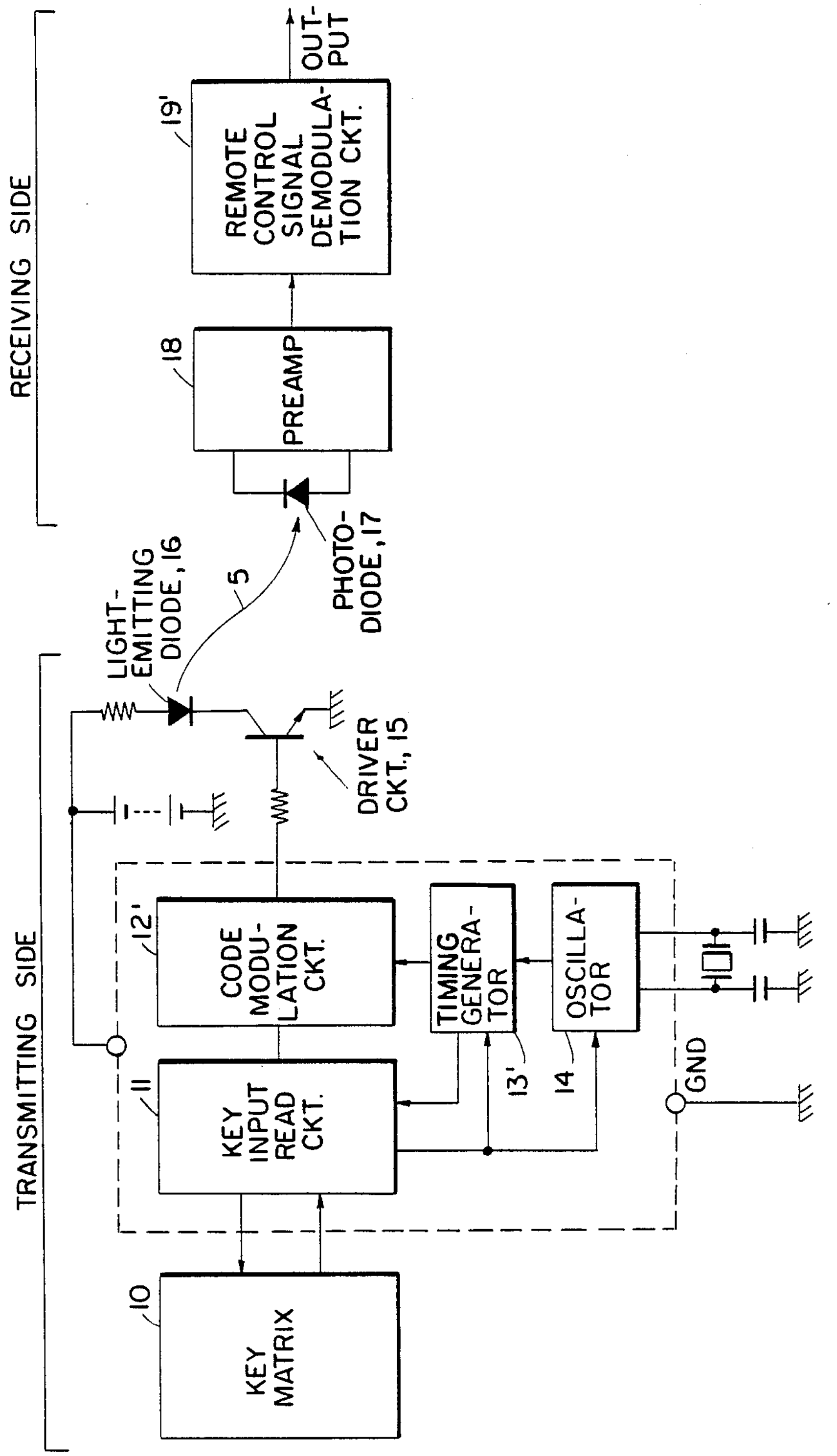
FIG. 6 shows a block diagram of a remote control system according to the present invention.

The transmission code is made up of the custom code 33 and the instruction code 34. The custom code 33 differs from the instruction code 34 in the number of bits contained therein. In the custom code 33 and in the instruction code 34, bits "0" and "1" are represented by different pulse intervals defined by the code modulation circuit 12' under control of the timing generation 13', both being shown in FIG. 6 which depicts a block diagram of a remote control system in accordance with the present invention.

Operations using the transmission code 33 shown in FIG. 5 will be described.

In the case where the signal transmitting side transmits a remote control signal, first the 7-bit custom code 33 is transmitted, and then the 8-bit instruction code 34 is transmitted under control of the remote control signal demodulation circuit, and as shown in FIG. 5.

On the signal receiving side, a pulse interval of 1 ms (t) is judged as "0", and a pulse interval of 2 ms (2t) as "1". If the pulse interval is longer than the longest pulse interval which can be taken as "1", for instance, 2.5 ms or longer, the number of bits of data which have been received is counted. If it is 7 bits, then the data is taken as a custom code 33, and if it is 8 bits, then it is taken as an instruction code 34. If the 7-bit custom code 33 thus received specifies the signal receiving side, then the 8-bit instruction code 34 which arrives next is interpreted and the instruction contained therein executed.

The transmission code is designed so that a pulse interval t is "0", a pulse interval 2t is "1", and a pulse interval 4t is provided between each custom code 33 and instruction code 34.

In a remote control system having six-bit custom codes 33 and 9-bit instruction codes 34, the transmission code is composed of 15 bits, as in the above example. Although the custom code 33 differs in the number of bits contained therein from the example, still no interference is caused in the system.

The invention has been described with reference to the case where an instruction is executed with one transmission code. However, the invention is not limited thereto or thereby. That is, in order to prevent erroneous operations such as may be caused by external noise, the system may be designed so that an instruction is executed only when the same transmission code is received twice or thrice in sequence.

In the example shown in FIG. 5, the custom code 33 contains 7 bits and the instruction code 34 eight bits. However, it should be noted that all that is necessary is to make the custom code 33 and the instruction code 34 different in their number of bits; that is, the numbers of bits of these codes can be set to desired values as far as they are different. Furthermore, in the example, the pulse intervals representing bits "0" and "1" are set to 1 ms and 2 ms, respectively, and the pulse interval indicating the interval between the custom code 33 and the instruction code 34 is set to 4 ms; however, these values can be freely determined so long as the individual bits, the custom code, and the instruction code can be identified on the signal receiving side.

As is apparent from the above description, according to the invention, without requiring an intricate circuit, the custom code and the instruction code forming the transmission code are made different in the number of bits contained in each, and in the custom code and the instruction code, "0" and "1" are represented by different pulse intervals, whereby interference between remote control systems is minimized, and a number of independent remote control systems can be employed.

We claim:

1. A remote control method comprising the steps of:

providing a custom code, said custom code comprising a plurality of a first number of bits indicative of a particular receiving unit, "0" and "1" bits of said custom code being distinguished by respective different time intervals between adjacent pulses;

providing an instruction code, said instruction code comprising a plurality of a second number of bits different from said first number and indicative of a predetermined operation to be carried out by said receiving unit, "0" and "1" bits of said instruction code being distinguished by the same intervals between adjacent pulses as said custom code;

providing a transmission code comprising said custom code followed by said instruction code, said custom code and said instruction code being separated from one another by a predetermined fixed time interval greater than said time intervals between adjacent pulses distinguishing said "0" and "1" bits, said predetermined fixed and time interval being a period during which a signal level remains substantially constant; and optically transmitting said transmission code.

2. The method as claimed in claim 1, wherein a pulse interval t represents data "0", a pulse interval of 2t represents data "1", and said interval between said custom code and said instruction code is 4t.

3. The method as claimed in claim 2, wherein t is approximately 1 ms.

* * * * *